US012581424B2

(12) United States Patent
Ali et al.

(10) Patent No.: US 12,581,424 B2
(45) Date of Patent: Mar. 17, 2026

(54) POWER SPECTRUM DENSITY BASED CONFIGURATION

(71) Applicant: Lenovo (Singapore) Pte. Ltd., New Tech Park (SG)

(72) Inventors: Ali Ramadan Ali, Kraiburg am Inn (DE); Ankit Bhamri, Rödermark (DE); Karthikeyan Ganesan, Kronberg im Taunus (DE); Alexander Johann Maria Golitschek Edler von Elbwart, Darmstadt (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 400 days.

(21) Appl. No.: 18/261,089

(22) PCT Filed: Dec. 29, 2021

(86) PCT No.: PCT/IB2021/062442
§ 371 (c)(1),
(2) Date: Jul. 11, 2023

(87) PCT Pub. No.: WO2022/153123
PCT Pub. Date: Jul. 21, 2022

(65) Prior Publication Data
US 2024/0323856 A1 Sep. 26, 2024

Related U.S. Application Data

(60) Provisional application No. 63/137,503, filed on Jan. 14, 2021.

(51) Int. Cl.
*H04W 4/00* (2018.01)
*H04W 52/14* (2009.01)
(Continued)

(52) U.S. Cl.
CPC ....... *H04W 52/146* (2013.01); *H04W 52/325* (2013.01); *H04W 72/044* (2013.01); *H04W 72/21* (2023.01)

(58) Field of Classification Search
CPC ............. H04W 52/146; H04W 52/325; H04W 72/044; H04W 72/21; H04W 72/23;
(Continued)

(56) References Cited

U.S. PATENT DOCUMENTS 10,912,068 B2 * 2/2021 Yin ........................ H04L 5/0055
2018/0076917 A1 * 3/2018 Pan ..................... H04L 27/2602
(Continued)

OTHER PUBLICATIONS

PCT/IB2021/062442, "Notification of Transmittal of the International Search Report and the Written Opinion of the International Searching Authority, or the Declaration", International Searching Authority, Apr. 8, 2022, pp. 1-12.
(Continued)

*Primary Examiner* — Phuongchau Ba Nguyen
(74) *Attorney, Agent, or Firm* — Kunzler Needham & Hilton

(57) ABSTRACT

Apparatuses, methods, and systems are disclosed for a power spectrum density based configuration. One method includes transmitting, from a user equipment, UCI bits via a PUCCH in a shared spectrum using multiple PRBs. The method includes receiving a configuration message including a number of resource blocks for a PUCCH format 0, a PUCCH format 1, or a PUCCH format 4 depending on a SCS. The configuration message indicates at least one technique that satisfies a PUCCH PSD requirement, and the PUCCH PSD requirement includes a larger sequence length generation, mapping information that maps time and frequency domain resources for larger sequence to multiple RBs or a repetition of sequences to multiple RBs, and/or information corresponding to subcarrier interlacing.

20 Claims, 7 Drawing Sheets

(51) Int. Cl.

| | |
|---|---|
| *H04W 52/32* | (2009.01) |
| *H04W 72/044* | (2023.01) |
| *H04W 72/21* | (2023.01) |

(58) Field of Classification Search
CPC ............. H04W 72/0446; H04W 88/08; H04W 72/0453; H04W 24/00; H04L 5/0007
See application file for complete search history.

(56) References Cited

U.S. PATENT DOCUMENTS

| | | | |
|---|---|---|---|
| 2019/0306876 A1* | 10/2019 | Golitschek Edler von Elbwart ... | H04L 5/0055 |
| 2020/0136777 A1* | 4/2020 | He ........................ | H04L 5/0007 |
| 2020/0305169 A1* | 9/2020 | Loehr ..................... | H04W 4/40 |
| 2021/0037605 A1* | 2/2021 | Kundu ................. | H04L 5/0053 |

OTHER PUBLICATIONS

Samsung, "Uplink signal and channel design for NR-U", 3GPP TSG RAN WG1 Meeting #94bis R1-1810859, Oct. 8-12, 2018, pp. 1-6.

Nokia et al., "Required changes to NR using existing DL/UL NR waveform", 3GPP TSG RAN WG1 #103 R1-2007926, Oct. 26-Nov. 13, 2020, pp. 1-41.
LG Electronics, "Consideration on required physical layer changes to support NR above 52.6 GHz", 3GPP TSG RAN WG1 #103-e R1-2009653, Oct. 26-Nov. 13, 2020, pp. 1-13.
Ericsson, "FL Summary 4 for Enhancements for PUCCH formats 0/1/4", 3GPP TSG-RAN WG1 Meeting #104-e R1-2102127, Jan. 25-Feb. 5, 2021, pp. 1-40.
Ericsson, "[Draft] LS to RAN4 on maximum UE conducted power and maximum UE EIRP for operation in the 52.6 -71 GHz band", 3GPP TSG RAN WG1#104bis-e R1-2104060, Apr. 12-20, 2021, pp. 1-1.
TSG RAN WG1, "LS to RAN4 on maximum UE conducted power and maximum UE EIRP for operation in the 52.6-71 GHz band", 3GPP TSG RAN WG1#104bis-e R1-2104061, Apr. 12-20, 2021, pp. 1-1.
3GPP, "3rd Generation Partnership Project; Technical Specification Group Radio Access Network; NR; Physical channels and modulation (Release 16)", 3GPP TS 38.211 V16.7.0, Sep. 2021, pp. 1-134.
3GPP, "3rd Generation Partnership Project; Technical Specification Group Radio Access Network; NR; Physical layer procedures for control (Release 16)", 3GPP TS 38.213 V16.7.0, Sep. 2021, pp. 1-188.

* cited by examiner

200

300

700

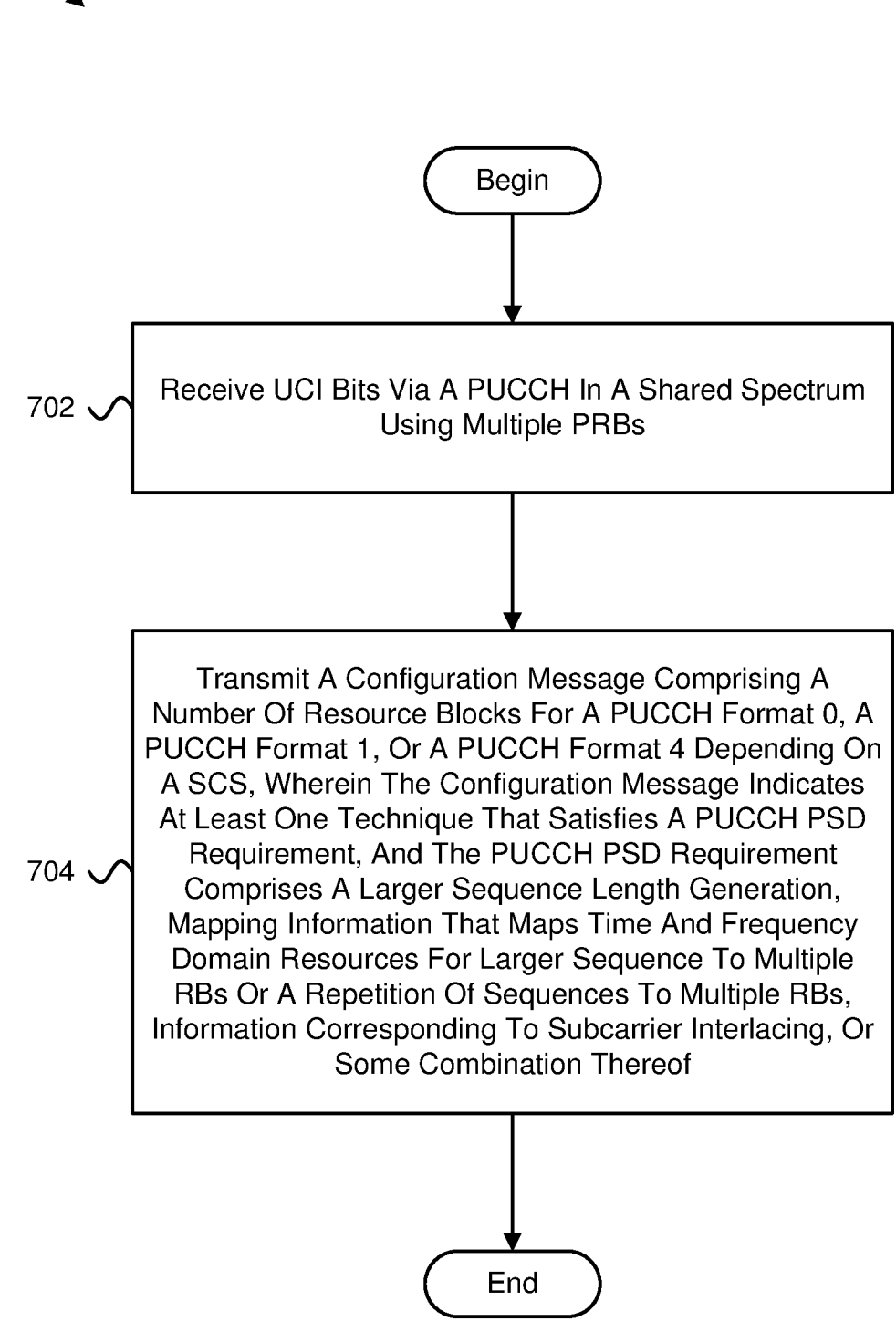

Begin

702 — Receive UCI Bits Via A PUCCH In A Shared Spectrum Using Multiple PRBs

704 — Transmit A Configuration Message Comprising A Number Of Resource Blocks For A PUCCH Format 0, A PUCCH Format 1, Or A PUCCH Format 4 Depending On A SCS, Wherein The Configuration Message Indicates At Least One Technique That Satisfies A PUCCH PSD Requirement, And The PUCCH PSD Requirement Comprises A Larger Sequence Length Generation, Mapping Information That Maps Time And Frequency Domain Resources For Larger Sequence To Multiple RBs Or A Repetition Of Sequences To Multiple RBs, Information Corresponding To Subcarrier Interlacing, Or Some Combination Thereof End

FIG. 7

POWER SPECTRUM DENSITY BASED CONFIGURATION

CROSS-REFERENCE TO RELATED APPLICATIONS

This application claims priority to U.S. Patent Application Ser. No. 63/137,503 entitled "APPARATUSES, METHODS, AND SYSTEMS FOR ENHANCEMENT FOR PUCCH FORMATS 0, 1, AND/OR 4 FOR B52.6 GHZ NR" and filed on Jan. 14, 2021 for Ali Ramadan Ali, which is incorporated herein by reference in its entirety.

FIELD

The subject matter disclosed herein relates generally to wireless communications and more particularly relates to a power spectrum density based configuration.

BACKGROUND

In certain wireless communications networks, there may be power spectrum density requirements. In such networks the power spectrum density requirements may change based on a configuration of the network.

BRIEF SUMMARY

Methods for a power spectrum density based configuration are disclosed. Apparatuses and systems also perform the functions of the methods. One embodiment of a method includes transmitting, from a user equipment, uplink control information (UCI) bits via a physical uplink control channel (PUCCH) in a shared spectrum using multiple physical resource blocks (PRBs). In some embodiments, the method includes receiving a configuration message including a number of resource blocks for a PUCCH format 0, a PUCCH format 1, or a PUCCH format 4 depending on a subcarrier spacing (SCS). The configuration message indicates at least one technique that satisfies a PUCCH power spectrum density (PSD) requirement, and the PUCCH PSD requirement includes a larger sequence length generation, mapping information that maps time and frequency domain resources for larger sequence to multiple resource blocks (RBs) or a repetition of sequences to multiple RBs, information corresponding to subcarrier interlacing, or some combination thereof.

One apparatus for a power spectrum density based configuration includes a user equipment. In some embodiments, the apparatus includes a transmitter that transmits uplink control information (UCI) bits via a physical uplink control channel (PUCCH) in a shared spectrum using multiple physical resource blocks (PRBs). In various embodiments, the apparatus includes a receiver that receives a configuration message including a number of resource blocks for a PUCCH format 0, a PUCCH format 1, or a PUCCH format 4 depending on a subcarrier spacing (SCS). The configuration message indicates at least one technique that satisfies a PUCCH power spectrum density (PSD) requirement, and the PUCCH PSD requirement includes a larger sequence length generation, mapping information that maps time and frequency domain resources for larger sequence to multiple resource blocks (RBs) or a repetition of sequences to multiple RBs, information corresponding to subcarrier interlacing, or some combination thereof.

Another embodiment of a method for a power spectrum density based configuration includes receiving, at a network device, UCI bits via a PUCCH in a shared spectrum using multiple PRBs. In some embodiments, the method includes transmitting a configuration message including a number of resource blocks for a PUCCH format 0, a PUCCH format 1, or a PUCCH format 4 depending on a SCS. The configuration message indicates at least one technique that satisfies a PUCCH PSD requirement, and the PUCCH PSD requirement includes a larger sequence length generation, mapping information that maps time and frequency domain resources for larger sequence to multiple RBs or a repetition of sequences to multiple RBs, information corresponding to subcarrier interlacing, or some combination thereof.

Another apparatus for a power spectrum density based configuration includes a network device. In some embodiments, the apparatus includes a receiver that receives UCI bits via a PUCCH in a shared spectrum using multiple PRBs. In various embodiments, the apparatus includes a transmitter that transmits a configuration message including a number of resource blocks for a PUCCH format 0, a PUCCH format 1, or a PUCCH format 4 depending on a SCS. The configuration message indicates at least one technique that satisfies a PUCCH PSD requirement, and the PUCCH PSD requirement includes a larger sequence length generation, mapping information that maps time and frequency domain resources for larger sequence to multiple RBs or a repetition of sequences to multiple RBs, information corresponding to subcarrier interlacing, or some combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 7 is a flow chart diagram illustrating another embodiment of a method for a power spectrum density based configuration.

DETAILED DESCRIPTION

Figure 1:
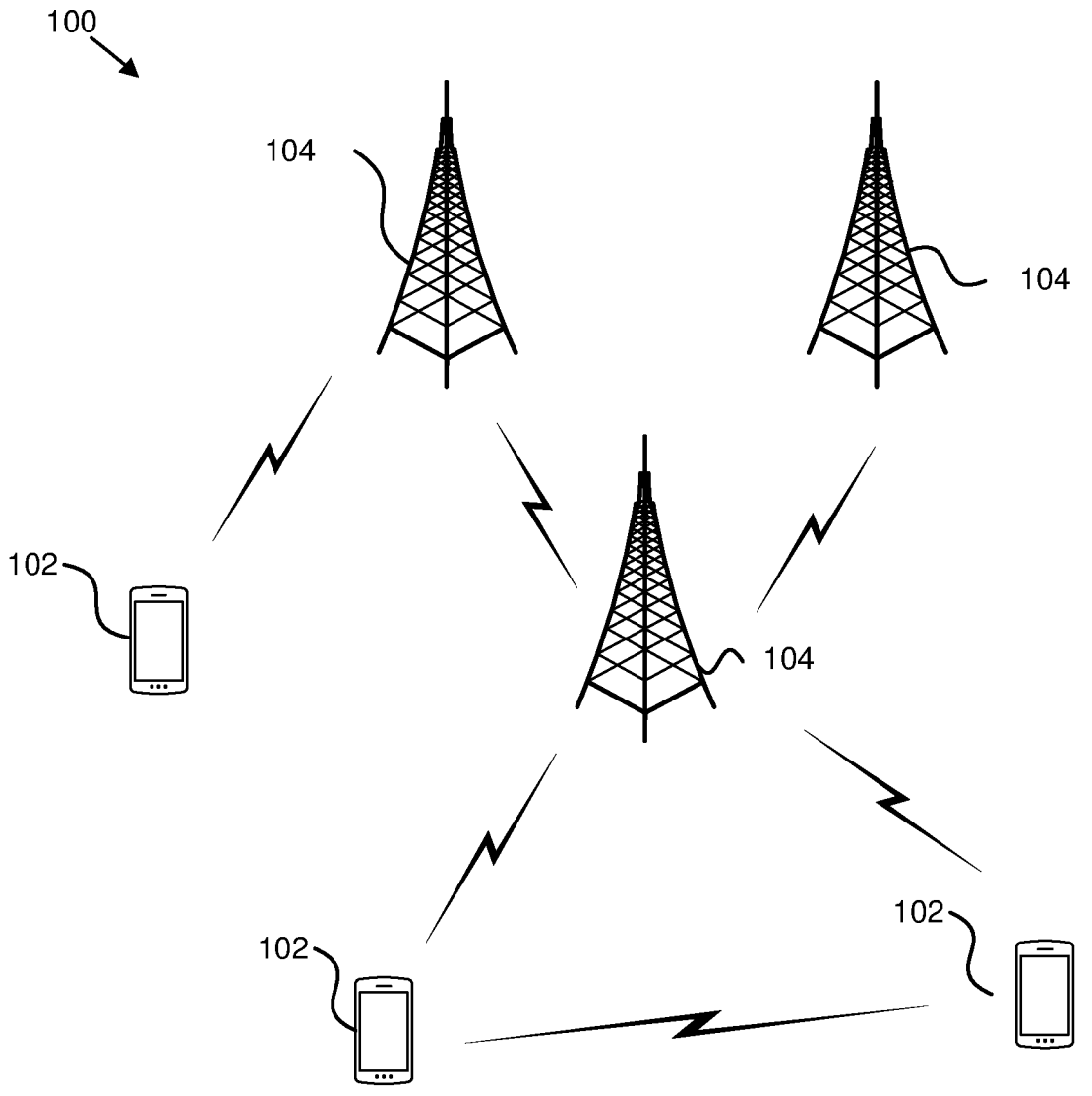
FIG. 1 is a schematic block diagram illustrating one embodiment of a wireless communication system for a power spectrum density based configuration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for a power spectrum density based configuration. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may transmit uplink control information (UCI) bits via a physical uplink control channel (PUCCH) in a shared spectrum using multiple physical resource blocks (PRBs). In some embodiments, the remote unit 102 may receive a configuration message including a number of resource blocks for a PUCCH format 0, a PUCCH format 1, or a PUCCH format 4 depending on a subcarrier spacing (SCS). The configuration message indicates at least one technique that satisfies a PUCCH power spectrum density (PSD) requirement, and the PUCCH PSD requirement includes a larger sequence length generation, mapping information that maps time and frequency domain resources for larger sequence to multiple resource blocks (RBs) or a repetition of sequences to multiple RBs, information corresponding to subcarrier interlacing, or some combination thereof. Accordingly, the remote unit 102 may be used for a power spectrum density based configuration.

In certain embodiments, a network unit 104 may receive UCI bits via a PUCCH in a shared spectrum using multiple PRBs. In some embodiments, the network unit 104 may transmit a configuration message including a number of resource blocks for a PUCCH format 0, a PUCCH format 1, or a PUCCH format 4 depending on a SCS. The configuration message indicates at least one technique that satisfies a PUCCH PSD requirement, and the PUCCH PSD requirement includes a larger sequence length generation, mapping information that maps time and frequency domain resources for larger sequence to multiple RBs or a repetition of sequences to multiple RBs, information corresponding to subcarrier interlacing, or some combination thereof. Accordingly, the network unit 104 may be used for a power spectrum density based configuration.

Figure 2:
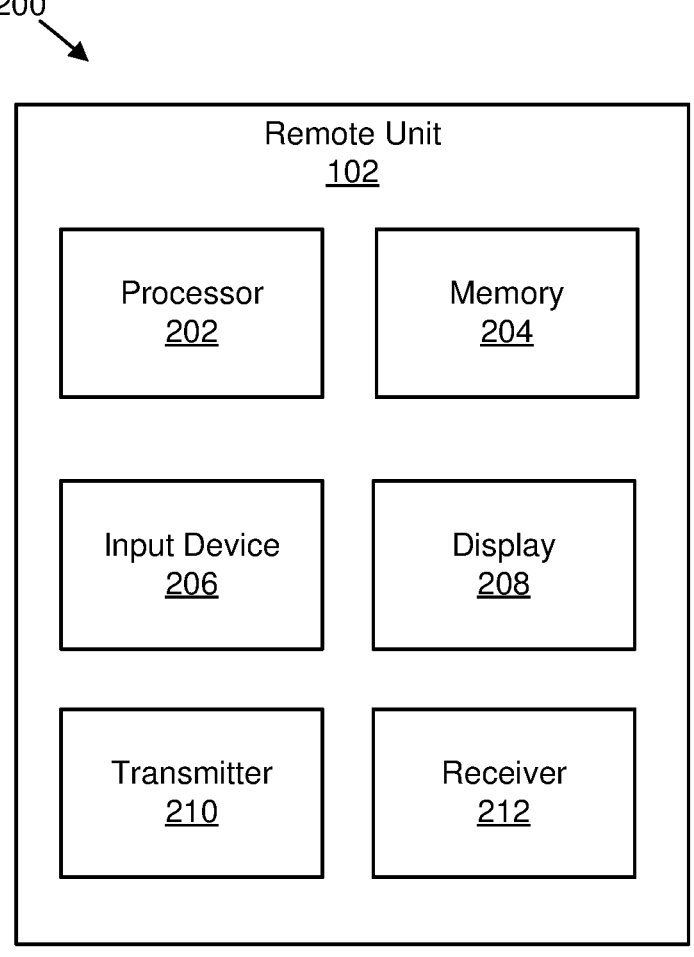
FIG. 2 is a schematic block diagram illustrating one embodiment of an apparatus that may be used for a power spectrum density based configuration.

FIG. 2 depicts one embodiment of an apparatus 200 that may be used for a power spectrum density based configuration. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the transmitter 210 transmits uplink control information (UCI) bits via a physical uplink control channel (PUCCH) in a shared spectrum using multiple physical resource blocks (PRBs). In various embodiments, the receiver 212 receives a configuration message including a number of resource blocks for a PUCCH format 0, a PUCCH format 1, or a PUCCH format 4 depending on a subcarrier spacing (SCS). The configuration message indicates at least one technique that satisfies a PUCCH power spectrum density (PSD) requirement, and the PUCCH PSD requirement includes a larger sequence length generation, mapping information that maps time and frequency domain resources for larger sequence to multiple resource blocks (RBs) or a repetition of sequences to multiple RBs, information corresponding to subcarrier interlacing, or some combination thereof.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
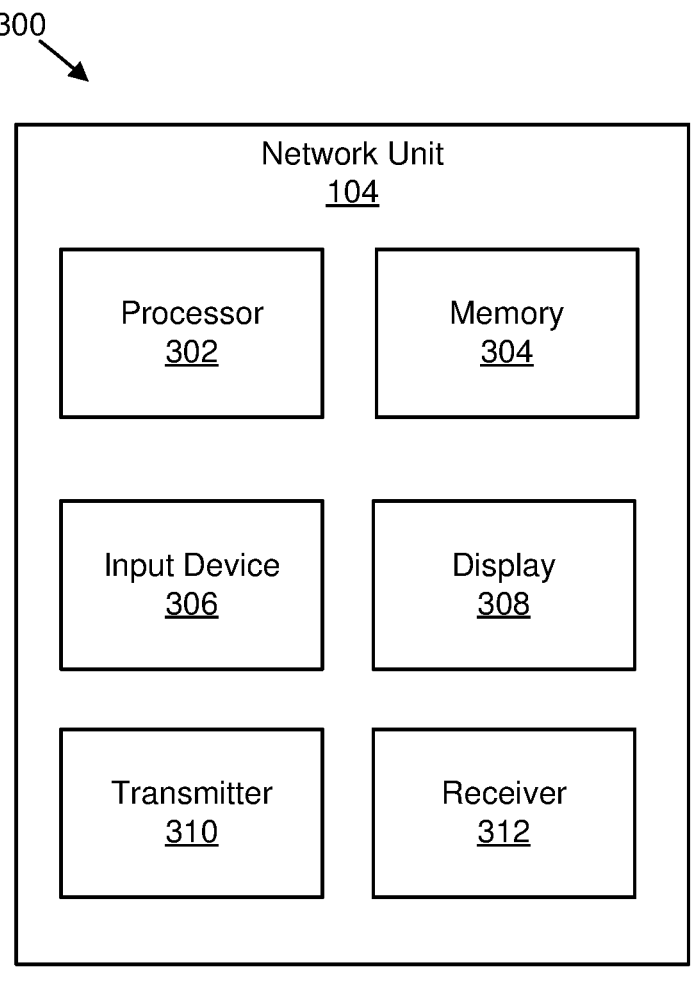
FIG. 3 is a schematic block diagram illustrating one embodiment of an apparatus that may be used for a power spectrum density based configuration.

FIG. 3 depicts one embodiment of an apparatus 300 that may be used for a power spectrum density based configuration. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 receives UCI bits via a PUCCH in a shared spectrum using multiple PRBs. In various embodiments, the transmitter 310 transmits a configuration message including a number of resource blocks for a PUCCH format 0, a PUCCH format 1, or a PUCCH format 4 depending on a SCS. The configuration message indicates at least one technique that satisfies a PUCCH PSD requirement, and the PUCCH PSD requirement includes a larger sequence length generation, mapping information that maps time and frequency domain resources for larger sequence to multiple RBs or a repetition of sequences to multiple RBs, information corresponding to subcarrier interlacing, or some combination thereof.

In certain embodiments, there may be maximum power spectrum density ("PSD") requirements per 1 MHz bandwidth resolution at 60 GHz band that differs depending on different regions. For example, the maximum PSD may be defined to be limited by 23 dBm/MHz in some regions, while may be more restricted in other regions for example with 13 dBm/MHz. A maximum UE conducted transmitted power in dBm at 60 GHz carrier frequency may depend on a transmission bandwidth according to a formula: 10*log 10 (500 mW×emission_BW/100 MHz). The required PSD may be satisfied if the user equipment ("UE") is configured with multiple resource block ("RB") transmission (e.g., using multiple RB physical uplink control channel ("PUCCH") formats 2, 3 for all supported subcarrier spacing ("SCS") (120 KHz, 480 KHz, 960 KHz)). On the other hand, PUCCH formats 0, 1, 4 in Rel-16 occupy only one RB for transmission, and hence PUCCH transmission at devices own effective isotropically radiated power ("EIRP") limit cannot be achieved specially for 120 KHz for low power mobile UEs and for all SCSs (120, 480, 960) for high power mobile UEs. The transmission power of a PUCCH signal under PSD restriction may be limited which leads to a coverage loss. Therefore, in some embodiments, formats may be enhanced to facilitate transmission power under EIRP and PSD requirements.

In various embodiments, there may be enhancements for single RB PUCCH formats under PSD limitation in a shared spectrum operation by mapping PUCCH information on multiple RBs according to supported subcarrier spacing even if it is indicated to feedback 1 or 2 bit uplink control information ("UCI").

Certain embodiments herein describing multi-PRB PUCCH transmissions may include: 1) a larger base sequence; 2) repetition in a frequency domain; and/or 3) sub-carrier/sub-RB interlacing.

Some embodiments herein may satisfy a PSD requirement by allowing larger bandwidth for PUCCH transmission such that a transmitted power per MHz is reduced while a total transmit power is increased due to a wider bandwidth.

In a first embodiment, a sequence length for demodulation reference signal ("DMRS")-less PUCCH may be increased. In the first embodiment, a UE is indicated with a number of RBs for transmitting PUCCH that carries one or two bits of UCI for acknowledgement ("ACK") or non-acknowledgement ("NACK") ("ACK/NACK") or scheduling request ("SR") based on DMRS-less PUCCH transmission. The UE is indicated to generate a long PUCCH sequence with a length that depends on a number of configured RBs for transmitting a PUCCH format OM (modified PUCCH format 0) with a larger number of orthogonal sequences than that used for PUCCH format 0. Since orthogonal sequences require a number of REs of a PUCCH to be larger than or equal to $2^k$, where k denotes a number of information bits of UCI, increasing the number of REs for mapping one or two bits does not affect the orthogonality between the sequences. In other words, a longer base sequence allows for multiple RB mapping of small UCI information without affecting phase rotation separations of the information bits for UE (e.g., the information bit of one bit ACK/NACK or SR can still be separated by $\pi$ phase rotation and two bits information are separated by $\pi 3/6$). For simultaneous ACK/NACK+ SR, the phase rotation separation may be $\pi/4$ for one bit ACK and $\pi/6$ for two bits. Using a longer base sequence may allow for multiplexing a higher number of UEs using the same time-frequency resources and different cyclic shifts of the same base sequence. For example, if the base sequence length is 24, then as many as 12 UEs may be multiplexed for transmitting one bit information for each of the UEs, where the minimum phase rotation separation between the 1st and 12th UE may be $2\pi/24$.

To span multiple RBs, a sequence generation may be modified based on a long base sequence $r_{u,v}$ (multiple of 12) as follows:

$$x\left(l \cdot M_{RB}^{PUCCH,0} \cdot N_{SC}^{RB} + n\right) = r_{u,v}^{\alpha,\delta}(n)$$

$$n = 0, 1, \ldots, M_{RB}^{PUCCH,0} \cdot N_{SC}^{RB} - 1.$$

Where $M_{RB}$ is a number of required PRBs for PUCCH format OM configured by higher layers. The number of PRBs depends on a required PSD for PUCCH transmission, the configured PUCCH SCS, as well as a maximum transmit power of the UE (e.g., a high-power or low-power mobile UE). Table 1 shows an example of a number of PRBs associated with a configured SCS with a maximum conducted power of 13 dBm for low power UEs and 27 dBm for high power UEs.

TABLE 1

| SCS [kHz] | Number of PRBs (Low power UE) | Number of PRBs (High power UE) |
|---|---|---|
| 120 | 4 | 70 |
| 480 | 1 | 18 |
| 960 | 1 | 9 |

In a second embodiment, there may be a mapping of PUCCH to resource elements on multiple RBs. According to the second embodiment, a UE is indicated with a number of RBs for transmitting PUCCH that carries one or two bits UCI for ACK/NACK or SR on PUCCH format 0 or 1, or more than two bits on PUCCH format 4. The UE is indicated to perform RE mapping of the generated sequence for DMRS-less PUCCH or the modulated PUCCH symbols for DMRS based PUCCH transmission such that the mapping covers more than a single RB depending on a configured SCS and PSD requirements.

For short PUCCH format transmission (e.g., format 0), instead of transmitting PUCCH REs on two orthogonal frequency division multiplexing ("OFDM") symbols, the UE is indicated to map the REs that may be transmitted on a second symbol for conventional PUCCH format 0 to the same (e.g., one) OFDM symbol allowing spanning two RBs in frequency (e.g., instead of 1 RB for conventional PUCCH format 0 spanning two OFDM symbols).

In one embodiment for PUCCH format 0, multiple (e.g., the same) base sequence of length N are used, where the number of base sequences is equal to the number of RBs configured for the PUCCH format if the base sequence length is 12. If the base sequence length is longer (e.g., 24), then one base sequence is mapped to 2 RBs and if 2 base sequences of length 24 are configured, then a total number of RBs is 4. Therefore, generally, a total number of RBs may be a multiple of (length of base sequence*number of base sequences)/12. The information bit for a PUCCH is transmitted depending upon a combination of phase rotation on each of the multiple base sequence on each of the multiple RBs. For example, if a UE is configured to use 2 RBs for a PUCCH format, and if the PUCCH format is required to transmit only one bit of information (e.g., ACK or NACK), then the ACK is indicated by the phase rotation 0 on each of the base sequence mapped to each of the RBs, and NACK is indicated by the phase rotation 0 on the 1st base sequence mapped to the first RB (e.g., with minimum index), and by the phase rotation $\pi$ on the 2nd base sequence mapped to the second RB (e.g., with minimum index+1).

In another embodiment, if 2 information bits are indicated in a PUCCH, then each of the base sequences is used independently for indication. For example, the 1st bit is indicated by phase rotation of the 1st base sequence mapped to the first RB (e.g., such as a least significant bit ("LSB") mapped to RB with minimum index) and the 2nd bit is indicated by the phase rotation of the 2nd base sequence mapped to the second RB (e.g., such as a most significant bit ("MSB") mapped to RB with minimum index+1).

In some embodiments, only 1 symbol is transmitted to indicate 1 or 2 bits of information and if multiple symbols are configured for transmission, then repetition on the other symbols is performed.

In various embodiments, for PUCCH format 1, a length of orthogonal code used for spreading a length-12 sequence (e.g., that multiplied with the modulated PUCCH information) is increased based on a number of required RBs and a number of configured OFDM symbols for PUCCH transmission such that a length of the orthogonal code may be a multiple of the number of configured OFDM symbols and the result after spreading is mapped to multiple RBs as shown in Table 2.

TABLE 2

| Number of configured PUCCH symbols | Orthogonal code length for 2RBs | Orthogonal code length for 4RBs |
|---|---|---|
| 4 OFDM symbols | 8 | 16 |
| 6 OFDM symbols | 12 | 24 |
| 8 OFDM symbols | 16 | 32 |

Figure 4:
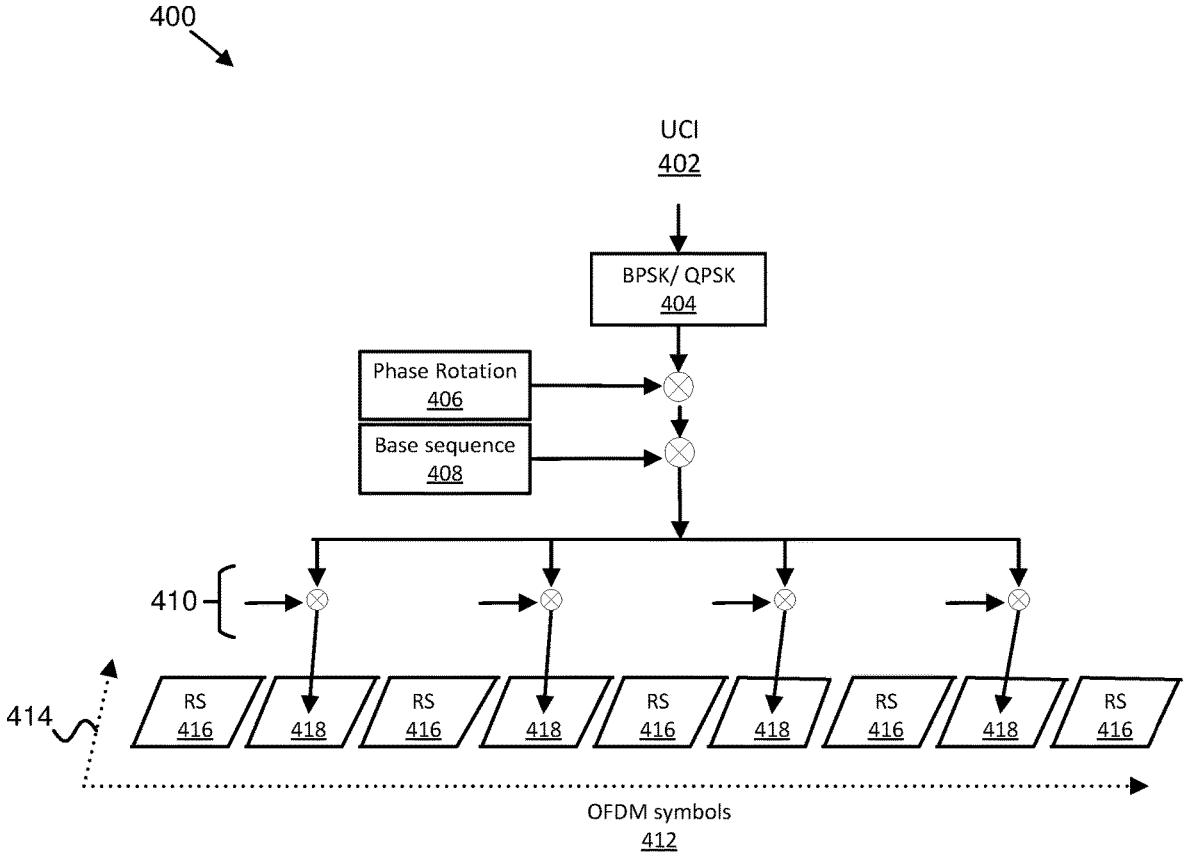
FIG. 4 is a schematic block diagram illustrating one embodiment of a system for mapping PUCCH format 1 on multiple PRBs.
Figure 5:
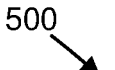
FIG. 5 is a schematic block diagram illustrating another embodiment of a system for mapping PUCCH format 1 on multiple PRBs.
Figure 5:
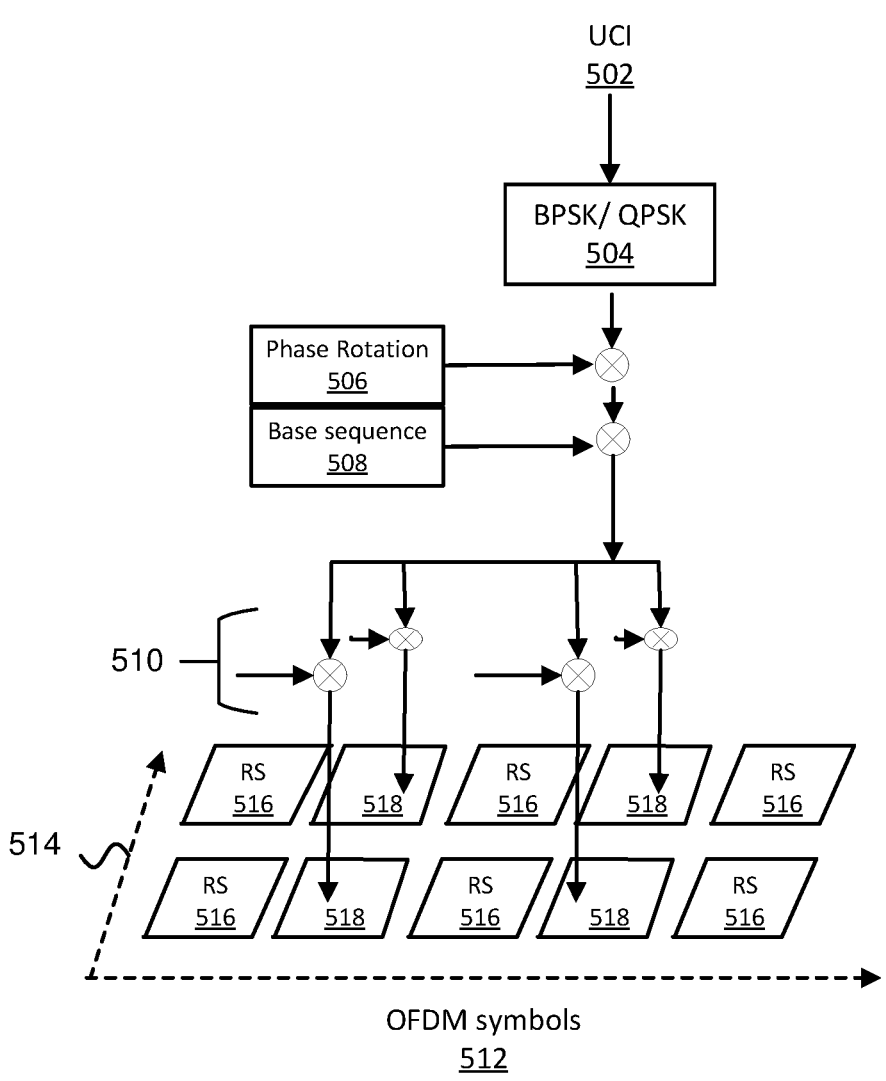

FIGS. 4 and 5 illustrate applying orthogonal code on both frequency and time for 2 RBs and two OFDM symbols.

Specifically, FIG. 4 is a schematic block diagram illustrating one embodiment of a system 400 for mapping PUCCH format 1 on multiple PRBs. In the system 400, UCI 402 is provided, and binary phase shift keying ("BPSK") and/or quadrature phase shift keying ("QPSK") 404 is applied. Further, a phase rotation 406 and a base sequence 408 are applied. Moreover, a length 4 orthogonal sequence 410 is applied and signaled to OFDM symbols 412 over 1 RB 414. The OFDM symbols 412 include RSs 416 and symbols 418.

FIG. 5 is a schematic block diagram illustrating another embodiment of a system 500 for mapping PUCCH format 1 on multiple PRBs. In the system 500, UCI 502 is provided, and BPSK and/or QPSK 504 is applied. Further, a phase rotation 506 and a base sequence 508 are applied. Moreover, a length 4 orthogonal sequence 510 is applied and signaled to OFDM symbols 512 over 2 RBs 514. The OFDM symbols 512 include RSs 516 and symbols 518.

For PUCCH format 4, modulated PUCCH information may be grouped in blocks of length multiple of 12 REs and discrete Fourier transform ("DFT") operation with length of 12×number of configured RBs for transform precoding to be applied and mapped to the configured RBs.

In a third embodiments, there may be frequency domain repetition for single RB PUCCH formats. According to the third embodiment, a UE is indicated with a number of RBs for transmitting PUCCH that carries one or two bits UCI for ACK/NACK or SR on format 0,1 or more than two bits on format 4 depending on a configured SCS and PSD requirements. The UE configured with format 0, 1, or 4 generates a single PUCCH RB with a corresponding format processing and may be indicated with a number of frequency domain repetition of the generated PUCCH RB. In one implementation, the generated sequence is repeated in multiple REs in one RB or multiple RBs or repeated only in a frequency domain or repeated both in frequency as well in the time domain. To keep a comparable coverage performance with a single RB transmission, a UE may apply a peak to average power ratio ("PAPR") mitigation technique to keep the PAPR below a certain threshold.

In a fourth embodiment, there may be sub-carrier/sub-RB interlacing for single RB PUCCH formats. According to the fourth embodiment, a UE is indicated with a number of RBs for transmitting PUCCH that carries one or two bits UCI for ACK/NACK or SR or more than two bits on format 4 depending on a configured SCS and PSD requirements. The UE configured with format 0, 1, or 4 generates a single PUCCH RB with a corresponding format processing and is configured to apply sub-RB or sub-carrier/sub-RB interlacing such that the 12 PUCCH subcarriers are mapped (e.g., distributed) to multiple RBs. Sub-PRB or sub-carrier/sub-RB interlacing may increase transmission power if PSD limitation exists as well as allowing for frequency division multiplexed ("FDMed") DMRS for DMRS based PUCCH transmission. However, a PAPR mitigation technique may be needed for keeping the PAPR below a certain threshold. In one implementation, the UE is configured with a number of interlaces and a delta spacing between interlaces and/or subcarriers. In another implementation, upon receiving information of a required number of RBs, a UE equally places 12 subcarriers on configured RBs starting from a first subcarrier of a first RB. In a further implementation, a UE is configured with a mapping table between interlacing spacing and configured SCS.

In a fifth embodiment, there may be an association between single RB PUCCH formats and multi-RB PUCCH formats. According to the fifth embodiment, a UE is indicated with number of RBs for transmitting PUCCH that carries one or two bits UCI for ACK/NACK or SR depending on a configured SCS and PSD requirements. The UE is configured to use PUCCH formats 2 or 3 to transmit one or two bits UCI (e.g., ACK/NACK and/or SR). Moreover, the UE is configured to use PUCCH format 2 or 3 instead of PUCCH format 0, 1 for transmitting the one or two bits UCI depending on a number of configured OFDM symbols for PUCCH (e.g., short→format 2 or long→format 3). A gNB configures the UE to use PUCCH format 2 instead of PUCCH format 0 if the number of UCI bits is one or two and the available PUCCH symbols is one or two symbols, and configures the UE to use PUCCH format 3 instead of PUCCH format 1 if the number of UCI bits is one or two and the available PUCCH symbols is between 4 and 14 symbols. To enhance performance, the UE may be configured to apply bit repetition of the one or two information bits.

In some embodiments, PUCCH format 2 and 3 may be used to transmit only ACK/NACK and/or SR without any channel state information ("CSI"), where a bit level repetition may be applied to ACK/NACK and/or SR bits to increase a payload size to a suitable length.

Figure 6:
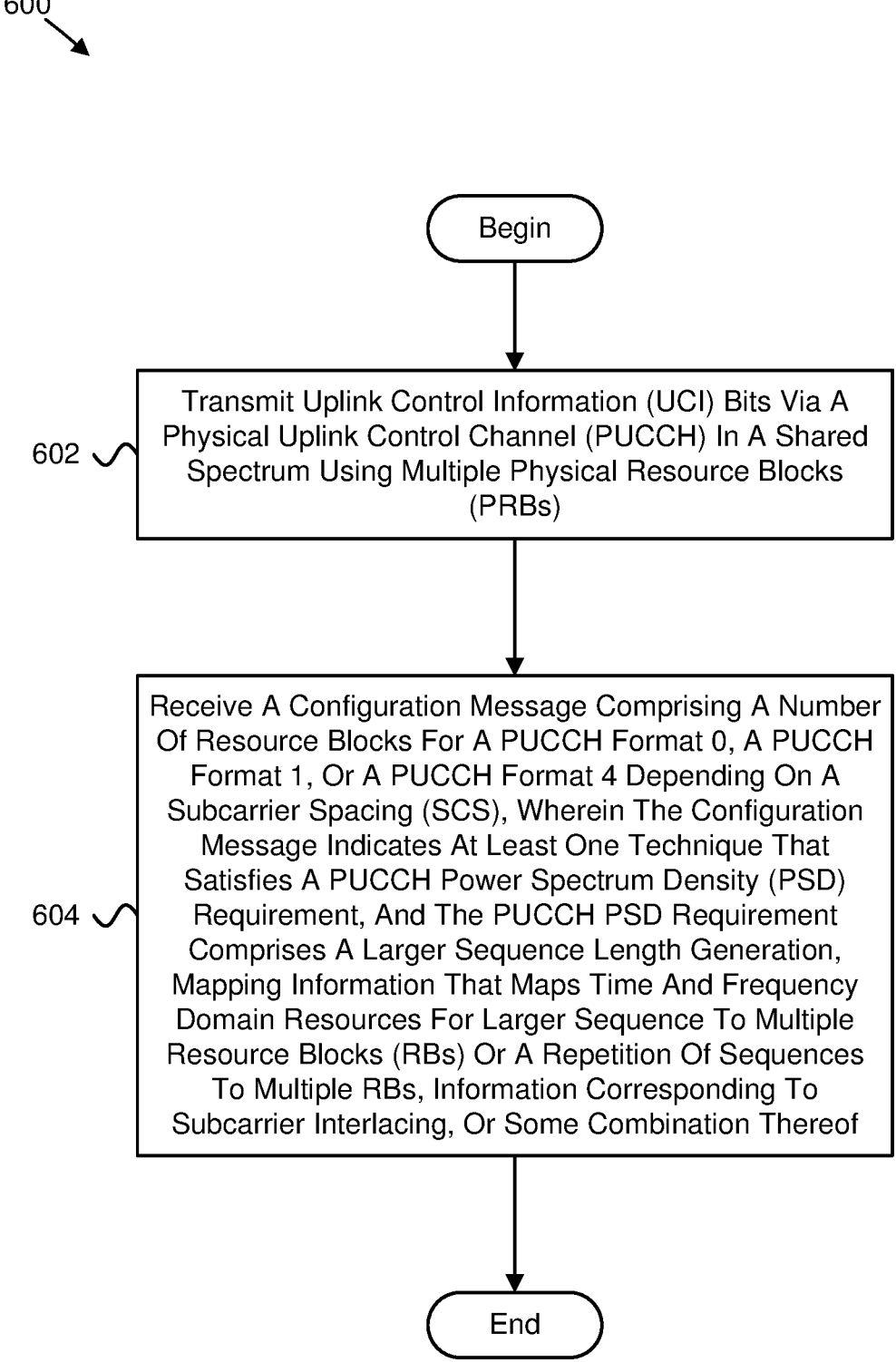
FIG. 6 is a flow chart diagram illustrating one embodiment of a method for a power spectrum density based configuration.

FIG. 6 is a flow chart diagram illustrating one embodiment of a method 600 for a power spectrum density based configuration. In some embodiments, the method 600 is performed by an apparatus, such as the remote unit 102. In certain embodiments, the method 600 may be performed by a processor executing program code, for example, a micro-controller, a microprocessor, a CPU, a GPU, an auxiliary processing unit, a FPGA, or the like.

In various embodiments, the method 600 includes trans-mitting 602 uplink control information (UCI) bits via a physical uplink control channel (PUCCH) in a shared spec-trum using multiple physical resource blocks (PRBs). In some embodiments, the method 600 includes receiving 604 a configuration message including a number of resource blocks for a PUCCH format 0, a PUCCH format 1, or a PUCCH format 4 depending on a subcarrier spacing (SCS). The configuration message indicates at least one technique that satisfies a PUCCH power spectrum density (PSD) requirement, and the PUCCH PSD requirement includes a larger sequence length generation, mapping information that maps time and frequency domain resources for larger sequence to multiple resource blocks (RBs) or a repetition of sequences to multiple RBs, information corresponding to subcarrier interlacing, or some combination thereof.

In certain embodiments, a number of PRBs and a number of orthogonal frequency division multiplexing (OFDM) symbols are chosen based on a subcarrier spacing and the PUCCH PSD requirement. In some embodiments, a long base sequence is used for PUCCH format 0 such that a length of the long base sequence is a multiple of a length-12 sequence for mapping multiple PRBs. In various embodi-ments, the method 600 further comprises using multiple sequences or multiple instances of the same sequence to carry multiple bits for the PUCCH format 0, wherein each sequence of the multiple sequences carries one information bit and is mapped to one PRB of the multiple PRBs.

In one embodiment, the method 600 further comprises receiving an indication to map PUCCH information on REs of multiple PRBs and reducing a number of OFDM symbols for PUCCH transmission. In certain embodiments, the method 600 further comprises receiving an indication to apply frequency domain repetition by mapping 12 PUCCH subcarriers with the multiple PRBs. In some embodiments, the method 600 further comprises receiving an indication to use a long orthogonal code for mapping REs in a frequency domain for the PUCCH format 1, wherein a length of the long orthogonal code is determined by multiplication of a number of configured symbols and a number of required PRBs.

In various embodiments, the method 600 further com-prises receiving information indicating a configuration to apply subcarrier/sub-RB interlacing on 12 PUCCH subcar-riers, wherein interlaces map delta frequency offsets with the multiple PRBs. In one embodiment, the method 600 further comprises receiving an indication to apply a discrete Fourier transform with a length equal to an indicated number of RBs for the PUCCH format 4.

FIG. 7 is a flow chart diagram illustrating another embodi-ment of a method 700 for a power spectrum density based configuration. In some embodiments, the method 700 is performed by an apparatus, such as the network unit 104. In certain embodiments, the method 700 may be performed by a processor executing program code, for example, a micro-controller, a microprocessor, a CPU, a GPU, an auxiliary processing unit, a FPGA, or the like.

In various embodiments, the method 700 includes receiv-ing 702 UCI bits via a PUCCH in a shared spectrum using multiple PRBs. In some embodiments, the method 700 includes transmitting 704 a configuration message including a number of resource blocks for a PUCCH format 0, a PUCCH format 1, or a PUCCH format 4 depending on a SCS. The configuration message indicates at least one technique that satisfies a PUCCH PSD requirement, and the PUCCH PSD requirement includes a larger sequence length generation, mapping information that maps time and fre-quency domain resources for larger sequence to multiple RBs or a repetition of sequences to multiple RBs, informa-tion corresponding to subcarrier interlacing, or some com-bination thereof.

In certain embodiments, a number of PRBs and a number of OFDM symbols are chosen based on a subcarrier spacing and the PUCCH PSD requirement. In some embodiments, a long base sequence is used for PUCCH format 0 such that a length of the long base sequence is a multiple of a length-12 sequence for mapping multiple PRBs. In various embodiments, multiple sequences or multiple instances of the same sequence are used to carry multiple bits for the PUCCH format 0, and each sequence of the multiple sequences carries one information bit and is mapped to one PRB of the multiple PRBs.

In one embodiment, the method 700 further comprises transmitting an indication to map PUCCH information on REs of multiple PRBs and reducing a number of OFDM symbols for PUCCH transmission. In certain embodiments, the method 700 further comprises transmitting an indication to apply frequency domain repetition by mapping 12 PUCCH subcarriers with the multiple PRBs. In some embodiments, the method 700 further comprises transmit-ting an indication to use a long orthogonal code for mapping REs in a frequency domain for the PUCCH format 1, wherein a length of the long orthogonal code is determined by multiplication of a number of configured symbols and a number of required PRBs.

In various embodiments, the method 700 further com-prises transmitting information indicating a configuration to apply subcarrier/sub-RB interlacing on 12 PUCCH subcar-riers, wherein interlaces map delta frequency offsets with the multiple PRBs. In one embodiment, the method 700 further comprises transmitting an indication to apply a discrete Fourier transform with a length equal to an indicated number of RBs for the PUCCH format 4.

In one embodiment, a method of a user equipment com-prises: transmitting uplink control information (UCI) bits via a physical uplink control channel (PUCCH) in a shared spectrum using multiple physical resource blocks (PRBs); and receiving a configuration message comprising a number of resource blocks for a PUCCH format 0, a PUCCH format 1, or a PUCCH format 4 depending on a subcarrier spacing (SCS), wherein the configuration message indicates at least one technique that satisfies a PUCCH power spectrum density (PSD) requirement, and the PUCCH PSD requirement comprises a larger sequence length generation, mapping information that maps time and frequency domain resources for larger sequence to multiple resource blocks (RBs) or a repetition of sequences to multiple RBs, information corresponding to subcarrier interlacing, or some combination thereof.

In certain embodiments, a number of PRBs and a number of orthogonal frequency division multiplexing (OFDM) symbols are chosen based on a subcarrier spacing and the PUCCH PSD requirement.

In some embodiments, a long base sequence is used for PUCCH format 0 such that a length of the long base sequence is a multiple of a length-12 sequence for mapping multiple PRBs.

In various embodiments, the method further comprises using multiple sequences or multiple instances of the same sequence to carry multiple bits for the PUCCH format 0, wherein each sequence of the multiple sequences carries one information bit and is mapped to one PRB of the multiple PRBs.

In one embodiment, the method further comprises receiving an indication to map PUCCH information on REs of multiple PRBs and reducing a number of OFDM symbols for PUCCH transmission.

In certain embodiments, the method further comprises receiving an indication to apply frequency domain repetition by mapping 12 PUCCH subcarriers with the multiple PRBs.

In some embodiments, the method further comprises receiving an indication to use a long orthogonal code for mapping REs in a frequency domain for the PUCCH format 1, wherein a length of the long orthogonal code is determined by multiplication of a number of configured symbols and a number of required PRBs.

In various embodiments, the method further comprises receiving information indicating a configuration to apply subcarrier/sub-RB interlacing on 12 PUCCH subcarriers, wherein interlaces map delta frequency offsets with the multiple PRBs.

In one embodiment, the method further comprises receiving an indication to apply a discrete Fourier transform with a length equal to an indicated number of RBs for the PUCCH format 4.

In one embodiment, an apparatus comprises a user equipment. The apparatus further comprises: a transmitter that transmits uplink control information (UCI) bits via a physical uplink control channel (PUCCH) in a shared spectrum using multiple physical resource blocks (PRBs); and a receiver that receives a configuration message comprising a number of resource blocks for a PUCCH format 0, a PUCCH format 1, or a PUCCH format 4 depending on a subcarrier spacing (SCS), wherein the configuration message indicates at least one technique that satisfies a PUCCH power spectrum density (PSD) requirement, and the PUCCH PSD requirement comprises a larger sequence length generation, mapping information that maps time and frequency domain resources for larger sequence to multiple resource blocks (RBs) or a repetition of sequences to multiple RBs, information corresponding to subcarrier interlacing, or some combination thereof.

In certain embodiments, a number of PRBs and a number of orthogonal frequency division multiplexing (OFDM) symbols are chosen based on a subcarrier spacing and the PUCCH PSD requirement.

In some embodiments, a long base sequence is used for PUCCH format 0 such that a length of the long base sequence is a multiple of a length-12 sequence for mapping multiple PRBs.

In various embodiments, the apparatus further comprises a processor that uses multiple sequences or multiple instances of the same sequence to carry multiple bits for the PUCCH format 0, wherein each sequence of the multiple sequences carries one information bit and is mapped to one PRB of the multiple PRBs.

In one embodiment, the receiver receives an indication to map PUCCH information on REs of multiple PRBs and reducing a number of OFDM symbols for PUCCH transmission.

In certain embodiments, the receiver receives an indication to apply frequency domain repetition by mapping 12 PUCCH subcarriers with the multiple PRBs.

In some embodiments, the receiver receives an indication to use a long orthogonal code for mapping REs in a frequency domain for the PUCCH format 1, wherein a length of the long orthogonal code is determined by multiplication of a number of configured symbols and a number of required PRBs.

In various embodiments, the receiver receives information indicating a configuration to apply subcarrier/sub-RB interlacing on 12 PUCCH subcarriers, wherein interlaces map delta frequency offsets with the multiple PRBs.

In one embodiment, the receiver receives an indication to apply a discrete Fourier transform with a length equal to an indicated number of RBs for the PUCCH format 4.

In one embodiment, a method of a network device comprises: receiving UCI bits via a PUCCH in a shared spectrum using multiple PRBs; and transmitting a configuration message comprising a number of resource blocks for a PUCCH format 0, a PUCCH format 1, or a PUCCH format 4 depending on a SCS, wherein the configuration message indicates at least one technique that satisfies a PUCCH PSD requirement, and the PUCCH PSD requirement comprises a larger sequence length generation, mapping information that maps time and frequency domain resources for larger sequence to multiple RBs or a repetition of sequences to multiple RBs, information corresponding to subcarrier interlacing, or some combination thereof In certain embodiments, a number of PRBs and a number of OFDM symbols are chosen based on a subcarrier spacing and the PUCCH PSD requirement.

In some embodiments, a long base sequence is used for PUCCH format 0 such that a length of the long base sequence is a multiple of a length-12 sequence for mapping multiple PRBs.

In various embodiments, multiple sequences or multiple instances of the same sequence are used to carry multiple bits for the PUCCH format 0, and each sequence of the multiple sequences carries one information bit and is mapped to one PRB of the multiple PRBs.

In one embodiment, the method further comprises transmitting an indication to map PUCCH information on REs of multiple PRBs and reducing a number of OFDM symbols for PUCCH transmission.

In certain embodiments, the method further comprises transmitting an indication to apply frequency domain repetition by mapping 12 PUCCH subcarriers with the multiple PRBs.

In some embodiments, the method further comprises transmitting an indication to use a long orthogonal code for mapping REs in a frequency domain for the PUCCH format 1, wherein a length of the long orthogonal code is determined by multiplication of a number of configured symbols and a number of required PRBs.

In various embodiments, the method further comprises transmitting information indicating a configuration to apply subcarrier/sub-RB interlacing on 12 PUCCH subcarriers, wherein interlaces map delta frequency offsets with the multiple PRBs.

In one embodiment, the method further comprises transmitting an indication to apply a discrete Fourier transform with a length equal to an indicated number of RBs for the PUCCH format 4.

In one embodiment, an apparatus comprises a network device. The apparatus further comprises: a receiver that receives UCI bits via a PUCCH in a shared spectrum using multiple PRBs; and a transmitter that transmits a configuration message comprising a number of resource blocks for a PUCCH format 0, a PUCCH format 1, or a PUCCH format 4 depending on a SCS, wherein the configuration message indicates at least one technique that satisfies a PUCCH PSD requirement, and the PUCCH PSD requirement comprises a larger sequence length generation, mapping information that maps time and frequency domain resources for larger sequence to multiple RBs or a repetition of sequences to multiple RBs, information corresponding to subcarrier interlacing, or some combination thereof.

In certain embodiments, a number of PRBs and a number of OFDM symbols are chosen based on a subcarrier spacing and the PUCCH PSD requirement.

In some embodiments, a long base sequence is used for PUCCH format 0 such that a length of the long base sequence is a multiple of a length-12 sequence for mapping multiple PRBs.

In various embodiments, multiple sequences or multiple instances of the same sequence are used to carry multiple bits for the PUCCH format 0, and each sequence of the multiple sequences carries one information bit and is mapped to one PRB of the multiple PRBs.

In one embodiment, the transmitter transmits an indication to map PUCCH information on REs of multiple PRBs and reducing a number of OFDM symbols for PUCCH transmission.

In certain embodiments, the transmitter transmits an indication to apply frequency domain repetition by mapping 12 PUCCH subcarriers with the multiple PRBs.

In some embodiments, the transmitter transmits an indication to use a long orthogonal code for mapping REs in a frequency domain for the PUCCH format 1, wherein a length of the long orthogonal code is determined by multiplication of a number of configured symbols and a number of required PRBs.

In various embodiments, the transmitter transmits information indicating a configuration to apply subcarrier/sub-RB interlacing on 12 PUCCH subcarriers, wherein interlaces map delta frequency offsets with the multiple PRBs.

In one embodiment, the transmitter transmits an indication to apply a discrete Fourier transform with a length equal to an indicated number of RBs for the PUCCH format 4.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:

transmitting uplink control information (UCI) bits via a physical uplink control channel (PUCCH) in a shared spectrum using multiple physical resource blocks (PRBs); and receiving a configuration message comprising a number of resource blocks for a PUCCH format 0, a PUCCH format 1, or a PUCCH format 4 depending on a subcarrier spacing (SCS), wherein the configuration message indicates at least one technique that satisfies a PUCCH power spectrum density (PSD) requirement, and the PUCCH PSD requirement comprises a larger sequence length generation, mapping information that maps time and frequency domain resources for larger sequence to multiple resource blocks (RBs) or a repetition of sequences to multiple RBs, information corresponding to subcarrier interlacing, or a combination thereof.

2. The method of claim 1, wherein a number of PRBs and a number of orthogonal frequency division multiplexing (OFDM) symbols are chosen based on a subcarrier spacing and the PUCCH PSD requirement.

3. The method of claim 1, wherein a long base sequence is used for PUCCH format 0 such that a length of the long base sequence is a multiple of a length-12 sequence for mapping multiple PRBs.

4. The method of claim 1, further comprising receiving an indication to apply frequency domain repetition by mapping 12 PUCCH subcarriers with the multiple PRBs.

5. The method of claim 1, further comprising receiving an indication to use a long orthogonal code for mapping REs in a frequency domain for the PUCCH format 1, wherein a length of the long orthogonal code is determined by multiplication of a number of configured symbols and a number of required PRBs.

6. The method of claim 1, further comprising receiving information indicating a configuration to apply subcarrier interlacing, sub resource block interlacing, or a combination thereof on 12 PUCCH subcarriers, wherein interlaces map delta frequency offsets with the multiple PRBs.

7. The method of claim 1, further comprising receiving an indication to apply a discrete Fourier transform with a length equal to an indicated number of RBs for the PUCCH format 4.

8. A user equipment (UE), comprising:

at least one memory; and at least one processor coupled with the at least one memory and configured to cause the UE to:

transmit uplink control information (UCI) bits via a physical uplink control channel (PUCCH) in a shared spectrum using multiple physical resource blocks (PRBs); and receive a configuration message comprising a number of resource blocks for a PUCCH format 0, a PUCCH format 1, or a PUCCH format 4 depending on a subcarrier spacing (SCS), wherein the configuration message indicates at least one technique that satisfies a PUCCH power spectrum density (PSD) requirement, and the PUCCH PSD requirement comprises a larger sequence length generation, mapping information that maps time and frequency domain resources for larger sequence to multiple resource blocks (RBs) or a repetition of sequences to multiple RBs, information corresponding to subcarrier interlacing, or a combination thereof.

9. The UE of claim 8, wherein a number of PRBs and a number of orthogonal frequency division multiplexing (OFDM) symbols are chosen based on a subcarrier spacing and the PUCCH PSD requirement.

10. The UE of claim 8, wherein a long base sequence is used for PUCCH format 0 such that a length of the long base sequence is a multiple of a length-12 sequence for mapping multiple PRBs.

11. The UE of claim 8, wherein the at least one processor is configured to cause the UE to receives an indication to apply frequency domain repetition by mapping 12 PUCCH subcarriers with the multiple PRBs.

12. The UE of claim 8, wherein the at least one processor is configured to cause the UE to receive an indication to use a long orthogonal code for mapping REs in a frequency domain for the PUCCH format 1, wherein a length of the long orthogonal code is determined by multiplication of a number of configured symbols and a number of required PRBs.

13. The UE of claim 8, wherein the at least one processor is configured to cause the UE to receive information indicating a configuration to apply subcarrier interlacing, sub resource block interlacing, or a combination thereof on 12 PUCCH subcarriers, wherein interlaces map delta frequency offsets with the multiple PRBs.

14. The UE of claim 8, wherein the at least one processor is configured to cause the UE to receive an indication to apply a discrete Fourier transform with a length equal to an indicated number of RBs for the PUCCH format 4.

15. A base station, comprising:
at least one memory; and
at least one processor coupled with the at least one memory and configured to cause the base station to:
receive uplink control information (UCI) bits via a physical uplink control channel (PUCCH) in a shared spectrum using multiple physical resource blocks (PRBs); and
transmit a configuration message comprising a number of resource blocks for a PUCCH format 0, a PUCCH format 1, or a PUCCH format 4 depending on a subcarrier spacing (SCS), wherein the configuration message indicates at least one technique that satisfies a PUCCH power spectrum density (PSD) requirement, and the PUCCH PSD requirement comprises a larger sequence length generation, mapping information that maps time and frequency domain resources for larger sequence to multiple resource blocks (RBs) or a repetition of sequences to multiple RBs, information corresponding to subcarrier interlacing, or a combination thereof.

16. A processor for wireless communication, comprising:
at least one controller coupled with at least one memory and configured to cause the processor to:
transmit uplink control information (UCI) bits via a physical uplink control channel (PUCCH) in a shared spectrum using multiple physical resource blocks (PRBs); and
receive a configuration message comprising a number of resource blocks for a PUCCH format 0, a PUCCH format 1, or a PUCCH format 4 depending on a subcarrier spacing (SCS), wherein the configuration message indicates at least one technique that satisfies a PUCCH power spectrum density (PSD) requirement, and the PUCCH PSD requirement comprises a larger sequence length generation, mapping information that maps time and frequency domain resources for larger sequence to multiple resource blocks (RBs) or a repetition of sequences to multiple RBs, information corresponding to subcarrier interlacing, or a combination thereof.

17. The processor of claim 16, wherein a number of PRBs and a number of orthogonal frequency division multiplexing (OFDM) symbols are chosen based on a subcarrier spacing and the PUCCH PSD requirement.

18. The processor of claim 16, wherein a long base sequence is used for PUCCH format 0 such that a length of the long base sequence is a multiple of a length-12 sequence for mapping multiple PRBs.

19. The processor of claim 16, wherein the at least one controller is configured to cause the processor to receive an indication to apply frequency domain repetition by mapping 12 PUCCH subcarriers with the multiple PRBs.

20. The processor of claim 16, wherein the at least one controller is configured to cause the processor to receive an indication to use a long orthogonal code for mapping REs in a frequency domain for the PUCCH format 1, wherein a length of the long orthogonal code is determined by multiplication of a number of configured symbols and a number of required PRBs.

* * * * *